Jan. 30, 1923.
H. D. THOMAS.
VEHICLE LOCKING DEVICE.
FILED AUG. 15, 1921.
1,443,662
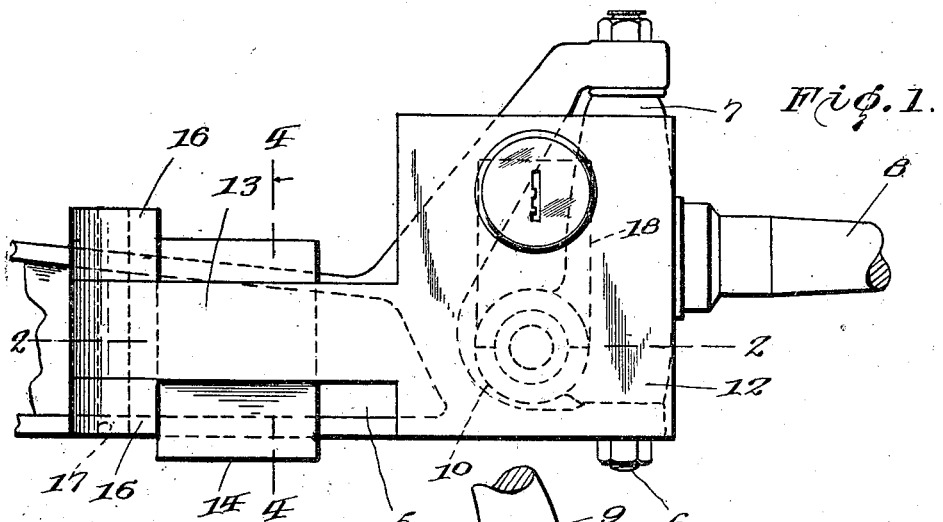
Fig. 1.
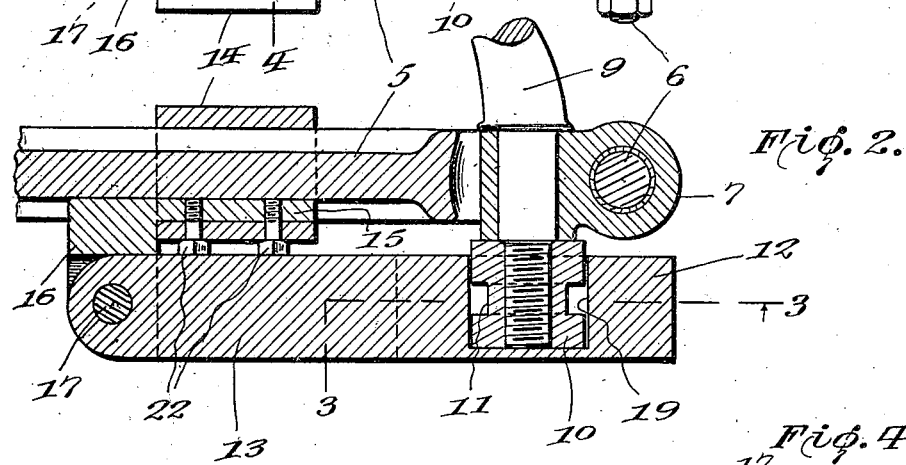
Fig. 2.
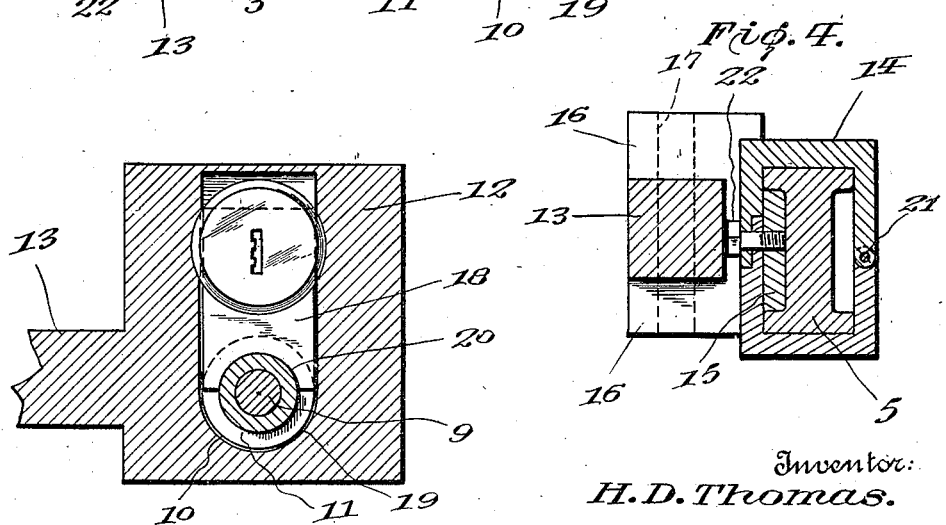
Fig. 3.
Fig. 4.
Inventor:
H. D. Thomas.
Attorneys.

Patented Jan. 30, 1923.

1,443,662

UNITED STATES PATENT OFFICE.

HARRY DWIGHT THOMAS, OF ELGIN, ILLINOIS.

VEHICLE LOCKING DEVICE.

Application filed August 15, 1921. Serial No. 492,428.

*To all whom it may concern:*

Be it known that I, HARRY DWIGHT THOMAS, a citizen of the United States, residing at Elgin, in the county of Kane and State of Illinois, have invented new and useful Improvements in Vehicle Locking Devices, of which the following is a specification.

This invention relates to locking devices applicable to automobiles and other motor vehicles, and designed to prevent the theft or unauthorized use thereof.

The invention relates more particularly to a lock which prevents the front wheels of the car from being swung around to steer the car, and the invention has for its object to provide a very simple and efficient locking device of this kind, and also one which can be readily installed.

With the object stated in view, the invention consists in a novel combination and arrangement of parts to be hereinafter described and claimed, and in order that the same may be better understood, reference is had to the accompanying drawing forming a part of this specification.

In the drawing, Figure 1 is a front elevation showing the application of the invention; Fig. 2 is a horizontal section on the line 2—2 of Fig. 1, Fig. 3 is a sectional detail on the line 3—3 of Fig. 2, and Fig. 4 is a cross section on the line 4—4 of Fig. 1.

Referring specifically to the drawing, 5 denotes one end of the front axle of a motor vehicle, the same being forked as usual for receiving the pivot bolt 6 whereby the spindle body 7 is connected to the axle. The front wheel (not shown) is carried by the spindle 8 extending laterally from the body 7. From the body 7 extends an arm 9 which is connected by a rod to a corresponding arm extending from the spindle body arm at the other end of the axle 5, whereby the two spindle bodies are made to swing together, as is well understood. The spindle body 7 is shown with a transverse opening in which the inner end of the arm 9 seats and is secured by a nut 10. This nut is of special design, it being provided with an external annular groove 11 for a purpose to be presently described.

On that side of the axle 5 where the nut 10 is located is positioned a lock casing 12 having a laterally extending and horizontal supporting arm 13 which is pivoted to a support carried by the axle. This support consists of a clamping member 14 which fits around the axle 5 and carries a base member 15 having at one end a pair of vertically spaced hinge knuckles 16 between which the arm 13 seats, with a pivot pin 17 passing through said knuckles and arm. The lock casing is thus pivotally supported a short distance inwardly of the spindle body 7 so as to come opposite the nut 10.

The lock casing 12 carries a key-operated, vertically slidable bolt 18, and its side which faces the nut 10 has a recess 19 adapted to seat the latter. The bolt 18 has a bottom notch 20, and it extends into the recess 19 when in advanced position.

In operation, the lock casing 12 is swung to locate the nut 10 inside the recess 19, and the bolt 18 is then advanced in a downward direction to seat its notched lower end in the groove 11 of the nut, the latter therefore serving as the keeper of the bolt. It will be evident that the steering gear of the car now cannot be operated, due to the fact that the spindle body 7 is locked and prevented from being swung around. To release the spindle body 7, it is necessary only to retract the bolt 18 so that it clears the nut 10, after which the lock casing 12 can be swung clear of the spindle body 7, so as not to enterfere with the movements thereof.

The clamp 14 is made up of two pivotally connected sections, the pivot being shown at 21, so that it may be placed around the axle 5 as clearly shown in Fig. 4. The base member 15 of the hinge knuckles 16 seats inside the clamp and is secured thereto by bolts 22. The knuckles 16 are at one end of the member 15, outside the clamps 14.

The device is very simple and efficient, and it can be readily installed without any changes or modifications in the axle 5 and the spindle body 7, except to apply the nut 10, which latter takes the place of the usual nut securing the arm 9 to the spindle body 7.

Referring to Figs. 2 and 5, it will be noted that the bolts 22 pass through the overlapping free ends of the two pivotally connected sections of the clamp 14, whereby said sections are held in place on the axle 5, and when the lock casing is placed in spindle-locking position, said casing covers the heads of the bolts, thereby effectually preventing the clamp from being tampered with.

I claim:

1. The combination with an axle and a pivoted spindle body; of a clamp fitted to the axle, a base member secured to the axle by the clamp, and having hinge knuckles, a lock casing having a supporting arm pivoted to the knuckles, a key-controlled bolt carried by the lock casing, and a keeper on the spindle body for said bolt.

2. The combination with an axle and a pivoted spindle body; of a clamp fitted to the axle and consisting of a pair of pivotally connected sections having their free ends overlapping, fasteners passing through said overlapping ends, a base member positioned between the clamp and the axle, into which base member the aforesaid fasteners pass, a lock casing having a supporting arm which is pivoted to the base member, and means on the spindle body engageable by the locking member for preventing movement of the spindle body.

3. The combination with an axle and a pivoted spindle body; of a clamp fitted to the axle and consisting of pivotally connected sections having their free ends overlapping, fasteners passing through said overlapping ends, a base member held between the clamp and the axle, into which base member the fasteners pass, a lock casing having a supporting arm which is pivoted to the base member to swing toward and from the spindle body, said supporting arm when the lock casing is swung toward the spindle body covering the aforesaid fasteners, and means on the spindle body engageable by the locking member for preventing movement of the spindle body.

4. The combination with an axle and a pivoted spindle body; of a clamp fitted to the axle, a base member secured to the axle by the clamp, a lock casing having a supporting arm pivotally connected to the base member, and means on the spindle body engageable by the locking member for preventing movement of the spindle body.

5. The combination with an axle and a pivoted spindle body; of a clamp fitted to the axle, a base member secured to the axle by the clamp, and having hinge knuckles, a lock casing having a supporting arm pivoted to the knuckles, and means on the spindle body engageable by the locking member for preventing movement of the spindle body.

In testimony whereof I affix my signature.

HARRY DWIGHT THOMAS.